United States Patent [19]
Smith et al.

[11] Patent Number: 6,129,309
[45] Date of Patent: Oct. 10, 2000

[54] AIRCRAFT ENGINE APPARATUS WITH REDUCED INLET VORTEX

[75] Inventors: David M. Smith, Santa Ana; John Dorris, III, Cypress, both of Calif.

[73] Assignee: McDonnell Douglas Corporation, St. Louis County, Mo.

[21] Appl. No.: 09/122,004

[22] Filed: Jul. 24, 1998

[51] Int. Cl.$^7$ .................................. B64B 1/24; F02G 3/00
[52] U.S. Cl. ...................................... 244/53 B; 60/39.092
[58] Field of Search ................................. 244/53 B, 53 R, 244/74, 134 R, 52; 60/39.091, 393.092, 39.093; 55/306

[56] References Cited

U.S. PATENT DOCUMENTS

| | | |
|---|---|---|
| 2,915,262 | 12/1959 | Klein .......................................... 244/74 |
| 2,976,952 | 3/1961 | Holland, Jr. . |
| 3,298,637 | 1/1967 | Lee . |
| 3,474,988 | 10/1969 | Cox et al. . |
| 3,527,430 | 9/1970 | Smith . |
| 3,599,429 | 8/1971 | Biegelis et al. . |
| 3,618,861 | 11/1971 | Holmes ....................................... 244/52 |
| 3,905,566 | 9/1975 | Anderson . |
| 4,860,534 | 8/1989 | Easley et al. .......................... 244/53 B |
| 5,123,240 | 6/1992 | Frost et al. ............................ 244/53 B |
| 5,123,242 | 6/1992 | Miller ...................................... 60/226.1 |
| 5,433,070 | 7/1995 | Amelio ................................. 60/39.092 |
| 5,662,292 | 9/1997 | Greene et al. ......................... 244/53 B |
| 5,697,394 | 12/1997 | Smith et al. .......................... 60/39.092 |
| 5,906,334 | 5/1999 | Chamay et al. ....................... 244/53 B |

*Primary Examiner*—Peter M. Poon
*Assistant Examiner*—Charles R Ducker, Jr.
*Attorney, Agent, or Firm*—Alston & Bird, LLP

[57] ABSTRACT

An aircraft engine apparatus with a reduced inlet vortex is provided which utilizes a vortex disruption system that periodically discharges pulses of engine bleed fluid through at least one outlet port opening through the inlet of the engine nacelle to disrupt the engine inlet vortex. The vortex disruption system thereby prevents ingestion of foreign matter into the engine inlet without sacrificing engine power, efficiency, or aircraft cruise performance.

17 Claims, 2 Drawing Sheets

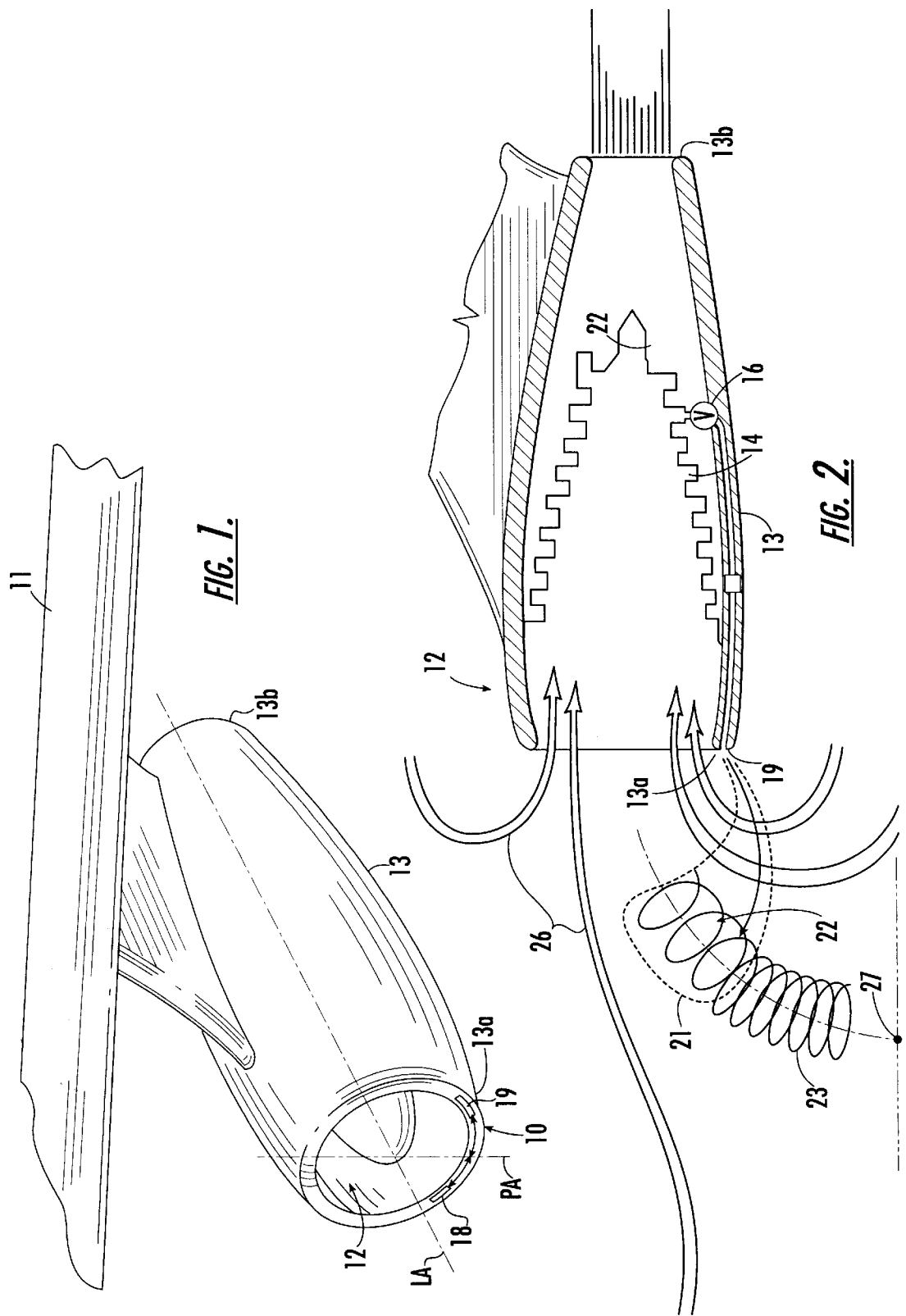

AIRCRAFT ENGINE APPARATUS WITH REDUCED INLET VORTEX

FIELD OF THE INVENTION

The present invention relates generally to an aircraft engine apparatus with a reduced inlet vortex and, more particularly, to an aircraft engine apparatus with a reduced inlet vortex that uses bleed air from the engine to disrupt an inlet vortex created at the engine air inlet.

BACKGROUND OF THE INVENTION

Aircraft engines for modern military and commercial aircraft require large quantities of air at very high-flow velocities and, as a result, are prone to the creation of an inlet vortex when operating at high power settings. Most often, this happens when the aircraft is operating at low speeds or stopped on the ground.

The suction created by turbofan or turbojet engines causes the formation of a stagnation point on the ground due to the asymmetric flow lines at the bottom of the engine inlet. An inlet vortex is formed when low velocity horizontal flow, such as wind, near the ground plane adds an additional velocity vector that is perpendicular to the normal stagnation flow lines. The horizontal flow near the ground is superimposed onto the vertical upflow of air from the ground and a vortex will immediately form, creating a swirling effect. The vortex that is created beneath the engine inlet is analogous to the vortex caused by the forces of nature, and increased intensity of either velocity vector will increase the magnitude and power of the vortex. The position in relation to the aircraft at which the vortex meets the ground plane is not a fixed point, but varies with external wind conditions.

When this vortex is formed there is a considerable reduction in pressure at the center of the vortex, thereby causing the vortex to act like a concentrated tornado, "vacuuming up" debris, dirt, stones and ice, creating Foreign Object Debris (FOD). When ingested into a turbofan or turbojet engine, FOD can damage engine components and cause mechanical failure of the engine by colliding with internal engine parts such as the engine impeller or fan blades. The closer to the ground that the aircraft engine hangs from the aircraft wing, the greater the intensity of the vortex and the more problematic FOD becomes.

An early solution to the FOD problem utilized a large "vacuum cleaner" to sweep the runways of airports where planes would operate, clearing the path of the airplane of all debris and potential FOD. cleansweeping runways, however, is not fullproof, requires expensive equipment, many man hours of time and is useless on gravel or unpaved runways. Accordingly, a better approach to eliminating FOD is through aircraft engine design. However, design of an engine that minimizes the potential for engine failure due to ingestion of FOD is a substantial challenge.

Engine designs address the inlet vortex problem in different ways while attempting to maintain engine thrust and efficiency. In particular, some conventional designs attempt to solve the inlet vortex problem by either reducing the intensity of the vortex or destroying the inlet vortex completely.

As an illustration, U.S. Pat. No. 3,298,637 for an "Engine Inlet Protective Screen Arrangement" discloses a conventional jet engine modified at the intake to include an encircling enlarged hollow conduit containing a series of holes around the circumference of the conduit. Pressurized air is discharged through the holes to create an air screen to restrain or block any dust or water which would tend to be thrown up by the engine during take-off. This "protective screen arrangement" is a continuous flow system that creates a wall of air to prevent the stagnation point from forming, requiring a large amount of bleed air flow from the engine. Although the '637 patent appears to solve the stagnation point problem, creation of the wall of air will also cause a large amount of debris to become airborne, potentially causing more FOD problems, and sacrifices thrust needed to back an aircraft. The configuration also requires a series of channels and doors to duct and direct the air flow, increasing the complexity and cost of the system.

Likewise, U.S. Pat. No. 3,474,988 discloses a "Pod For A Gas Turbine Engine" to reduce ingestion of debris into the engine inlet. The "pod" is a front fan pod and has a part-cylindrical panel which swings down and forward from the pod. The purpose of the panel is to present a debris-free surface to the air intake of the engine so that the vortex is formed on the panel, and not on the ground in front of the engine intake. The '988 patent contemplates that a complex mechanical system be deployed into the inlet flow of the engine. At a minimum, deploying a mechanical system into the inlet flow makes the system vulnerable to FOD, and potentially, creates FOD due to part breakage and ingestion into the engine.

Also noteworthy is U.S. Pat. No. 3,527,430 which discloses "Protective Air Curtains For Aircraft Engine Inlets" to prevent ingestion of stones and debris into the aircraft engine when the aircraft is on the ground. The air curtain is blown from a forwardly-projecting tube to disrupt the inlet vortex and isolate the intake air flow from the region of the ground where the stagnation point forms and from where loose material might be lifted. The system disclosed in the '430 patent requires continuous flow which demands a large amount of the core compressor bleed air flow from the engine to be directed down to the runway surface, potentially kicking up additional debris which can be ingested into the engine as FOD. Moreover, the positioning of the device in front of the engine inlet will increase the drag of the aircraft and cause potential disturbances in flight to the aircraft wings and flaps.

U.S. Pat. No. 3,905,566 describes a "Jet Engine Intake Protection System" for forming a fluid barrier in proximity to the lower leading portion of the forward intake end of an aircraft engine. The fluid barrier is projected forward of the intake end of the engine and is parallel to the direction of flow of air into the engine, thereby attempting to prevent ingestion of matter into the engine intake. This approach seemingly recognizes the deficiencies of the previous patents by providing a relatively simple design with few, if any, moving parts, and creates a wall of air via continuous flow through many slots in the leading edge of the engine. However, this approach uses continuous brute flow force to create a barrier, draining the engine of power, increasing engine temperatures as power settings increase and disadvantageously impacting engine life.

Notwithstanding the numerous prior systems for reducing FOD ingestion by an aircraft engine, there is still a need for a simple, low cost, highly reliable aircraft engine inlet vortex disruption system that disrupts the engine inlet vortex and eliminates the creation of FOD at low or static aircraft speed while maintaining engine power and efficiency.

SUMMARY OF THE INVENTION

These and other needs are provided, according to the invention, by an aircraft engine apparatus resulting in a reduced inlet vortex. The aircraft engine apparatus includes a vortex disruption system that periodically discharges pulses of engine bleed fluid through at least one outlet port opening through the leading end of the engine nacelle. The inlet vortex created by the suction of the engine is thus disrupted, thereby preventing ingestion of foreign matter into the engine inlet without significantly effecting engine power, efficiency, or aircraft cruise performance.

The vortex disruption system according to the present invention includes at least one engine bleed port for extracting fluid bled from the aircraft engine. Compressed bleed fluid is preferably supplied by a compressor. The vortex disruption system also includes at least one outlet port opening through a leading end of the engine nacelle of the aircraft engine and a passageway or tube for establishing fluid communication between the engine bleed port and the outlet port. Preferably, a shutoff valve is also included for terminating the flow of fluid between the engine bleed port and the outlet port.

Also included as part of the vortex disruption system is means for permitting intermittent fluid flow through the passageway such that pulses of fluid are periodically discharged through the outlet port opening to disrupt the inlet vortex. The frequency of periodic pulses of fluid discharged through the outlet port opening is a function of the engine inlet area, flow rate, distance of the engine from the ground and strength of the vortex. The intermittent fluid flow means is preferably a device selected from the group consisting of a fluidic diverter valve, mechanical siren and signal generator. Each of these devices share the common characteristic of being capable of rapidly switching an inlet flow between two outlet ports.

In one embodiment, the vortex disruption system has two outlet ports opening through the leading end of the engine nacelle and two passageways for establishing fluid flow between the bleed port and the two outlet ports. In this embodiment, the intermittent fluid flow means permits alternating periodic pulses of fluid flow through each of the two passageways such that periodic pulses of fluid are alternately discharged through the two outlet ports to disrupt the inlet vortex. Preferably, the two outlet ports are located an equal and opposite distance from an axis perpendicular to the center line of the engine.

An outlet port door is also preferably included as part of the aircraft engine apparatus. The outlet port door covers the outlet port in a closed position during deactivation of the vortex disruption system and is in an open position during system operation.

Therefore, an aircraft engine apparatus resulting in a reduced inlet vortex according to the present invention utilizes a simple, low cost, highly reliable aircraft engine vortex disruption system to eliminate the creation of FOD at low or static aircraft speed while maintaining engine power and efficiency.

BRIEF DESCRIPTION OF THE DRAWINGS

Some of the objects and advantages of the invention have been set forth and other objects and advantages of the invention will become apparent in the detailed description of the preferred embodiments of the invention to follow, especially when taken in conjunction with the accompanying drawings, which are not necessarily drawn to scale:

FIG. 1 is an environmental perspective view of an aircraft wing section with an aircraft engine apparatus according to one embodiment of the present invention attached thereto;

FIG. 2 is a schematic side cross-sectional view of an aircraft engine which shows the relationships between the engine, the engine inlet, the streamlines of the propulsion airstream being sucked into the inlet, an inlet vortex which is capable of carrying FOD into the intake stream, and an unstable region produced by a vortex disruption system of the aircraft engine apparatus according to one embodiment of the present invention.

DETAILED DESCRIPTION OF THE PREFERRED EMBODIMENTS

Figure 3:
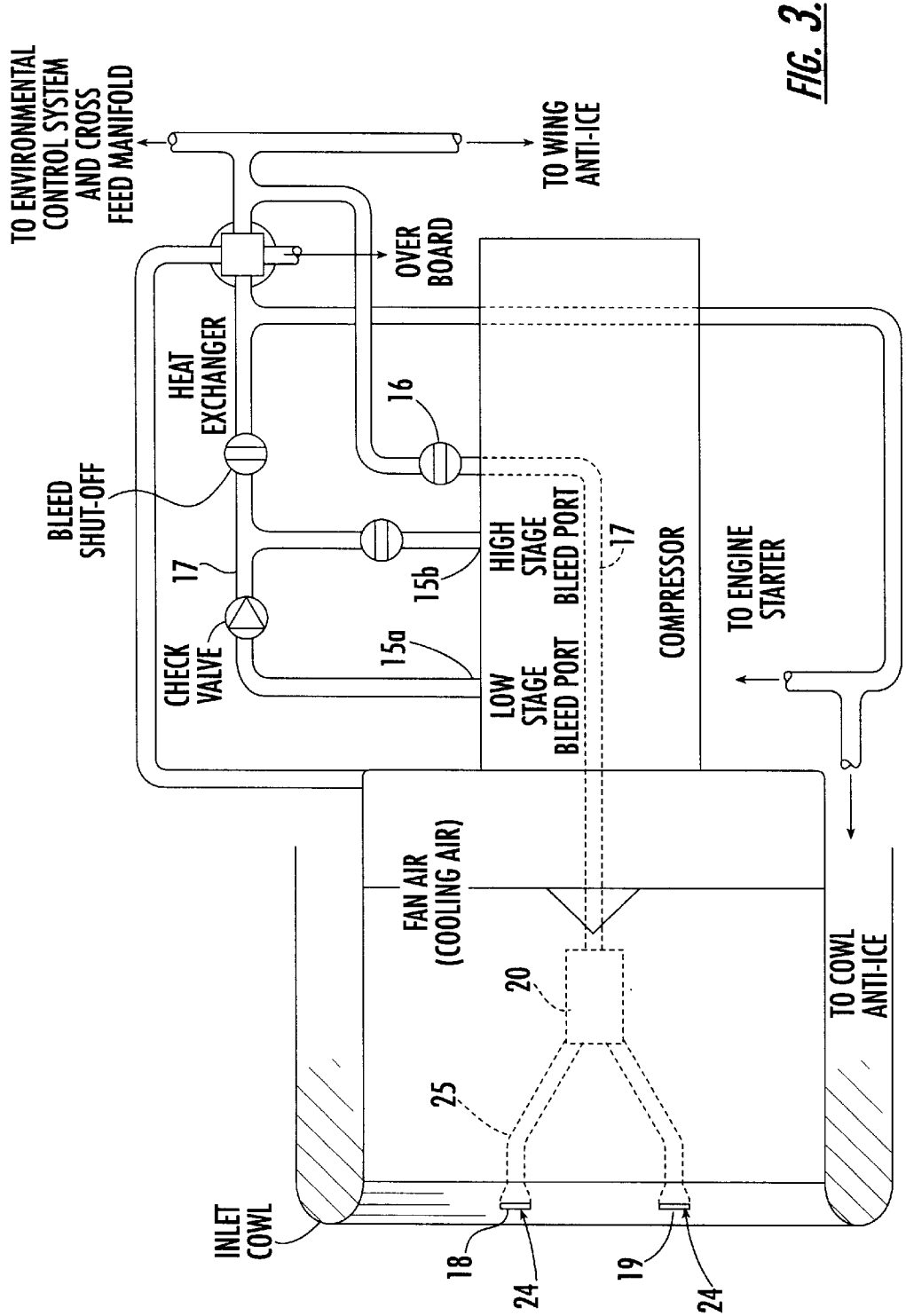
FIG. 3 is a schematic view of an aircraft engine that includes one embodiment of the vortex disruption system of the present invention depicted in block diagram form.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, an aircraft engine apparatus 10 according to one embodiment of the present invention is illustrated attached below and supported by a section of an airplane wing 11. The aircraft engine apparatus 10 includes a vortex disruption system that bleeds fluid from an associated turbojet aircraft engine 12 and periodically discharges pulses of fluid to thereby disrupt an inlet vortex that may otherwise exist at the engine inlet. While the illustrated embodiment and the following description describe the aircraft engine apparatus of the present invention in conjunction with a turbojet engine, the aircraft engine apparatus need not include a turbojet engine, but may be used in conjunction with other compatible aircraft engines known to those skilled in the art which are prone to the creation of an inlet vortex, such as turbofan aircraft engines. The design and components of such conventional aircraft engines are well known to those skilled in the art and, consequently, will not be discussed in detail herein.

As shown in FIG. 1, the aircraft engine apparatus 10 includes the aircraft engine 12 that has an engine nacelle 13 having an inlet 13a and an exhaust nozzle 13b. The engine inlet 13a of the present invention generally defines a longitudinal axis LA which is orthogonal to a central axis PA. The central axis PA is preferably vertical when the aircraft is on the ground. As shown in FIG. 2, the inlet 13a of the engine nacelle 13 allows air for combustion support to be drawn into the engine 12. The combustion gases of the engine 12 exit at the exhaust nozzle 13b of the engine nacelle 13. The engine 12 has a compressor 14 for compressing the air drawn into the inlet prior to combustion and, according to the present invention, has a bleed port 15 and a shut-off valve 16.

According to the present invention, the aircraft engine apparatus includes a vortex disruption system. As best illustrated in FIG. 3, some amount of compressed fluid is bled off of the compressor 14 at bleed port 15a or 15b via tubing 17 that defines a respective passageway to at least one outlet port opening through the inlet 13a of the engine nacelle 13. Preferably, two outlet ports 18 and 19 open through the inlet 13a of the engine nacelle 13. In one embodiment, the outlet ports 18 and 19 are located an equal an opposite distance from the central axis PA at the inlet 13a of engine nacelle 13. The outlet ports 18 and 19, however, may be offset angularly from the central axis PA by varying amounts.

In addition to the outlet ports and the tubing, the vortex disruption system includes means 20, located downstream of the tubing 17, for permitting intermittent fluid flow through the at least one outlet port. The intermittent fluid flow means 20 operates such that pulses of fluid are periodically discharged through said at least one outlet port. In the embodiment shown in FIG. 3, a pair of discharge tubes 25, located downstream of intermittent fluid flow means 20, define respective passageways which carry the pulses of periodically discharged fluid to the two outlet ports 18 and 19 such that fluid pulses are alternately discharged via the two outlet ports. The means 20 can produce alternating fluidic pulses at any desired frequency. The exact frequency of the fluidic pulses is a function of the engine inlet area, flow rate, distance of the engine from the ground and strength of the vortex. As shown in FIG. 2, the fluidic discharge from the two outlet ports creates a fluid flow 21 and an unstable region 22 below the inlet of the aircraft engine 12 to prevent the formation of an inlet vortex 23.

Intermittent fluid flow means 20 is preferably a device selected from the group consisting of a fluidic diverter valve, mechanical siren and signal generator. Each of these devices share the common characteristic of being capable of rapidly switching an inlet flow between two outlet ports. Preferably, outlet port doors 24 are included as part of the aircraft engine apparatus 10. The outlet port doors 24 are in an open position during operation of the vortex disruption system and remain in a closed position while the vortex disruption system is deactivated.

FIG. 3 illustrates a typical large commercial or military transport engine bleed system with one embodiment of the present invention incorporated therein. It should be apparent from FIG. 3 that the flow of bleed air to the outlet ports 18 and 19 is controlled by intermittent fluid flow means 20 and shutoff valve 16. The fluid flow means 20, shutoff valve 16 and outlet port doors 24 are typically controlled by a controller (not shown). The controller may be operated from within the cockpit by the pilot, or may be preprogrammed to automatically regulate the system to initiate operation of the system while the aircraft is on the ground and to prevent operation while the aircraft is in flight.

When the aircraft engine 12 is in operation and operating at a high power setting such as while the aircraft is at low speeds, taxing or stopped on the ground, the airflow throughout the aircraft engine 12 causes a plurality of fluid flows 26 (inlet streamlines) from varying directions towards the engine nacelle 13 at the inlet 13a, as shown in FIG. 2. One of these fluid flows is a vertical upflow of air from the ground or runway area. The vertical upflow alone will not have the force to lift any substantial foreign matter from the ground area. However, when other forces or flows interfere with the upward directed flow, such as a light horizontal wind near the ground that intersects with the vertical upflow, circulatory forces are superimposed onto the vertical upflow of air and a stagnation point 27 and the inlet vortex 23 will form. This inlet vortex 23 will vary in magnitude, but intensification of any of the forces will increase the power of the vortex 23, increasing its ability to carry stones and debris into the aircraft engine 12. When the aircraft is operating at low speeds or is on the ground, however, the aircraft engine apparatus 10 is activated and the outlet port doors 24 are open. In addition, the shut-off valve 16 is opened and compressed fluid is bled off of the compressor 14 via tubing 17 to the intermittent fluid flow means 20. The means 20 periodically discharges alternating pulses of fluid through each of the discharge tubes 25 and out through outlet ports 18 and 19, creating a fluid flow 21. The fluid flow 21 creates an unstable region 22, below the inlet of the aircraft engine 12. The unstable region 22 interdicts with the fluid flows being sucked toward the aircraft inlet 13a, thereby disrupting the already unstable inlet vortex 23 and preventing ingestion of debris into the inlet 13a of the aircraft engine 12. Accordingly, the aircraft engine apparatus having a reduced inlet vortex according to the present invention utilizes this simple, low cost, highly reliable aircraft engine vortex disruption system to eliminate the creation of FOD at low or static aircraft speed while maintaining engine power and efficiency.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation, the scope of the invention being set forth in the following claims.

That which is claimed is:

1. An aircraft engine apparatus having a reduced inlet vortex, the aircraft engine apparatus comprising:

an aircraft engine having an engine nacelle extending lengthwise between an opposing inlet and exhaust nozzle; and a vortex disruption system comprising at least one outlet port opening through said inlet of said engine nacelle, wherein said vortex disruption system bleeds fluid from said aircraft engine and periodically discharges pulses of fluid through said at least one outlet port such that the periodic pulses of fluid disrupt the inlet vortex while the aircraft is on the ground.

2. An aircraft engine apparatus as defined in claim 1, further comprising a compressor for supplying compressed fluid to be periodically discharged through said at least one outlet port.

3. An aircraft engine apparatus as defined in claim 1, wherein said vortex disruption system further comprises:

at least one engine bleed port for receiving fluid from the aircraft engine;

at least one passageway for establishing fluid communication between said at least one bleed port and said at least one outlet port; and means for permitting intermittent fluid flow through said tube such that pulses of fluid are periodically discharged through said at least one outlet port to thereby disrupt the inlet vortex.

4. An aircraft engine apparatus as defined in claim 3, wherein said vortex disruption system further comprises two outlet ports through said inlet of said engine nacelle of the aircraft engine, each said outlet port located an equal and opposite distance from an axis perpendicular to a center line of the engine.

5. An aircraft engine apparatus as defined in claim 3, further comprising a shutoff valve for terminating the flow of fluid between said engine bleed port and said at least one outlet port.

6. An aircraft engine apparatus as defined in claim 3, further comprising at least one outlet port door, said at least one outlet port door being in an open position during operation of said vortex disruption system and in a closed position during deactivation of said vortex disruption system.

7. An aircraft engine apparatus as defined in claim 3, wherein said vortex disruption system further comprises two outlet ports opening through said inlet of said engine nacelle of said aircraft engine and two passageways for establishing fluid communication between said bleed port and said two outlet ports such that said intermittent fluid flow means permits alternating periodic pulses of fluid flow through each of said two tubes such that periodic pulses of fluid are alternately discharged through said two outlet ports to thereby disrupt the inlet vortex.

8. An aircraft engine apparatus as defined in claim 3, wherein said intermittent fluid flow means is a device selected from the group consisting of a fluidic diverter valve, mechanical siren and signal generator.

9. A vortex disruption system for disrupting an inlet vortex generated by an aircraft engine having an engine nacelle, the vortex disruption system comprising:

at least one engine bleed port for receiving fluid from the aircraft engine;

at least one outlet port opening through an inlet of the engine nacelle of the aircraft engine;

at least one passageway for establishing fluid communication between said bleed port and said at least one outlet port; and means for permitting intermittent fluid flow through said tube such that pulses of fluid are periodically discharged through said at least one outlet port such that the periodic pulses of fluid disrupt the inlet vortex.

10. A vortex disruption system as defined in claim 9, wherein said vortex disruption system further comprises two outlet ports opening through said inlet of the engine nacelle of the aircraft engine, each said outlet port located an equal and opposite distance from an axis perpendicular to a center line of the engine.

11. A vortex disruption system as defined in claim 9, further comprising a shutoff valve for terminating the flow of fluid between said engine bleed port and said at least one outlet port.

12. A vortex disruption system as defined in claim 9, further comprising at least one outlet port door, said at least one outlet port door being in an open position during operation of said vortex disruption system and in a closed position during deactivation of said vortex disruption system.

13. A vortex disruption system as defined in claim 9, wherein said vortex disruption system further comprises two outlet ports opening through said inlet of the engine nacelle of the aircraft engine and two passageways for establishing fluid communication between said bleed port and said two outlet ports such that said intermittent fluid flow means permits alternating periodic pulses of fluid flow through each of said two tubes such that periodic pulses of fluid are alternately discharged through said two outlet ports to thereby disrupt the inlet vortex.

14. A vortex disruption system as defined in claim 9, wherein said intermittent fluid flow means is a device selected from the group consisting of a fluidic diverter valve, mechanical siren and signal generator.

15. A vortex disruption system as defined in claim 9, wherein said intermittent fluid flow means discharges fluid through said at least one outlet port at a frequency that is less than or equal to one thousand hertz.

16. A method of reducing an inlet vortex generated by an aircraft engine, comprising the steps of:

drawing fluid through an engine nacelle of the aircraft engine having an opposed inlet and exhaust nozzle;

bleeding off a portion of the fluid flowing through the aircraft engine during said drawing step; and periodically discharging pulses of fluid bled from the fluid flowing through the aircraft engine while the aircraft is on the ground, wherein said discharging step comprises periodically discharging pulses of fluid through at least one outlet port that opens through the inlet of the engine nacelle such that the periodic pulses of fluid disrupt the inlet vortex.

17. A method of reducing an inlet vortex generated by an aircraft engine according to claim 16, wherein said discharging step comprises periodically discharging alternating pulses of fluid through two outlet ports opening through the inlet of the engine nacelle to thereby disrupt the inlet vortex.

* * * * *